J. G. OLSSON.
MACHINE FOR MANUFACTURING DRAWERS FOR MATCH BOXES AND THE LIKE.
APPLICATION FILED JAN. 9, 1909.
978,195.
Patented Dec. 13, 1910.
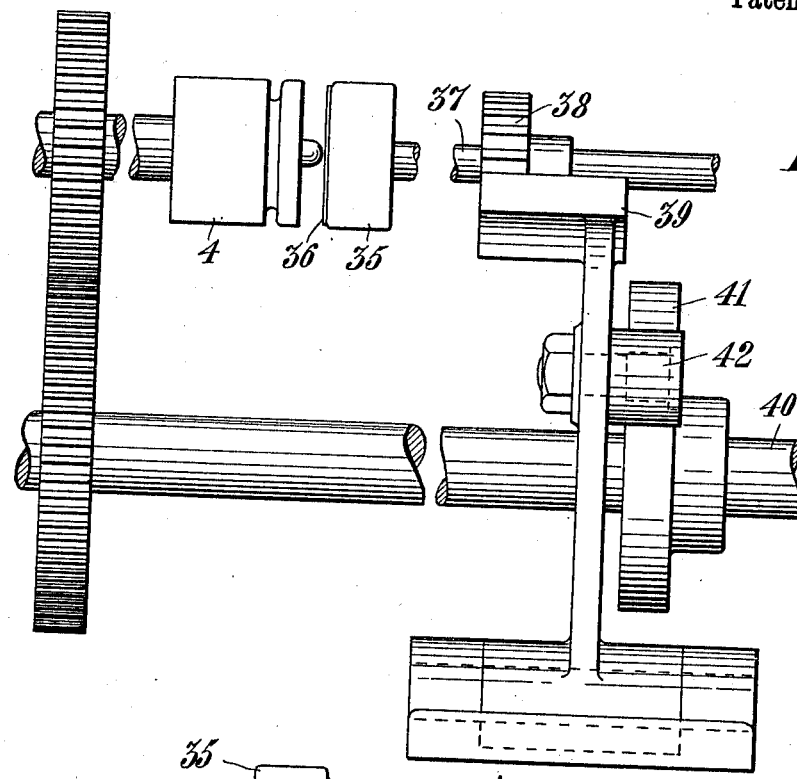
Fig. 1.
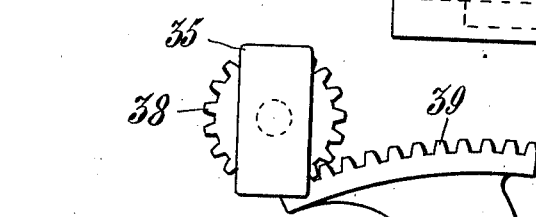
Fig. 2.
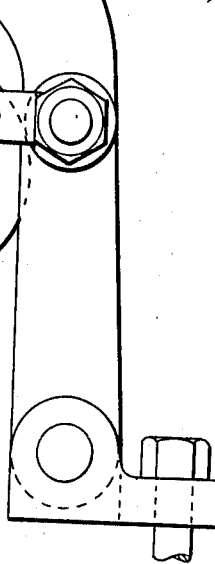
Witnesses
Inventor

UNITED STATES PATENT OFFICE.

JOHAN GUSTAF OLSSON, OF JÖNKÖPING, SWEDEN, ASSIGNOR TO JÖNKÖPINGS OCH VULCANS TÄNDSTICKSFABRIKSAKTIEBOLAG, OF JÖNKÖPING, SWEDEN.

MACHINE FOR MANUFACTURING DRAWERS FOR MATCH-BOXES AND THE LIKE.

978,195. Specification of Letters Patent. Patented Dec. 13, 1910.

Application filed January 9, 1909. Serial No. 471,487.

*To all whom it may concern:*

Be it known that I, JOHAN GUSTAF OLSSON, a subject of the King of Sweden, residing at Torp, in the town of Jönköping, in the Kingdom of Sweden, have invented new and useful Improvements in Machines for Manufacturing Drawers for Match-Boxes and the Like, of which the following is a specification, reference being had to the drawing accompanying and forming a part hereof.

This invention relates to machines for manufacturing drawers for match boxes and the like.

In a prior patent application No. 462465, filed November 13, 1908, a method of manufacturing match boxes is described in which the box is formed by the box-blank, suitably a thin piece of wood, being wound about a rotary mandrel, said method consisting in that the blank is attached to the mandrel and the finished box is pushed off the same while the mandrel is continuously rotating. Obviously, this method is especially adapted for manufacturing outer casings without bottom, so that the casings may be ready-made on one and the same mandrel. When, on the contrary, inner boxes or drawers are to be manufactured, particular measures must be taken for attaching the bottom, which cannot be performed while the mandrel rotates.

The object of the invention is to enable the bottom to be attached to the drawer without interruption of the continuous rotation of the winding mandrel.

The invention consists, chiefly, in that the box-blanks wound on the continuously rotating mandrel are slid onto another mandrel rotating, while the sliding movement takes place, synchronously with the former mandrel, but which is caused to stop after it has received the box-blank in order to allow the bottom to be attached. When the bottom has been attached and the ready-made drawer has been removed from the mandrel, which is still at rest, said mandrel is again set in motion, a new box-blank, which in the meantime has been ready-wound on the continuously rotating mandrel, is moved therefrom onto the intermittently rotating mandrel, and so on.

The invention further covers a machine consisting of two co-axially arranged mandrels one of which rotates continuously, while the other, on which the attaching of the bottom is performed, is rotated intermittently. The latter may be driven in any suitable manner, for instance by a toothed segment engaging a cog-wheel connected to the mandrel, said segment being suitably actuated by a cam attached to the continuously rotating main shaft of the machine and by a spring, weight or the like.

The invention further comprises the construction and combination of parts hereinafter more particularly described.

In the drawing, I have shown, by way of example, two diagrammatic views of a machine embodying the invention.

Figure 1 is a front view and Fig. 2 is a side view of the said machine.

Referring to the drawing, 4 is the continuously rotating mandrel on which the box-blank and the paper strip are wound. When the part of the box which is adapted to form the sides has been ready-wound, it is moved, by any suitable device, onto the mandrel 35 upon the front side of which the bottom 36 has before been placed in order to be attached to the sides of the box. In order that the mandrel 4 may be allowed to rotate continuously it is, obviously, a necessary condition that the mandrel 35 rotates in the same direction and with accurately the same speed as that of the mandrel 4, while the box-blank is slid from one mandrel onto the other, whereupon it is stopped in order to allow the box to be finished and removed and a new bottom to be attached thereto.

In the embodiment illustrated a spur-wheel 38 is attached to the axle 37 carrying the mandrel 35. Engaging with the said spur-wheel 38 is a toothed segment 39 to which is imparted an oscillating movement from the continuously rotating main shaft 40 by means of a cam 41 attached thereto, said cam actuating the roller 42 against the action of the spring 43. The part of the cam 41 producing the rotation of the mandrel 35, during the movement of the box-blank from the mandrel 4 onto the mandrel 35, must have such a shape that the movement of the mandrel 35 entirely coincides with that of the mandrel 4. When the mandrel 35 has received the blank 36 (for instance a thin piece of wood) adapted to form the bottom of the box, it is turned about 90° in the direction opposite to the direction of rotation of the mandrel 4, whereupon it turns and follows the mandrel 4 during the time necessary for moving the next box-blank from one mandrel onto the other.

Although I have described my invention with particular regard to the manufacture of match-boxes, it is obvious that the invention may be used in manufacturing other similar boxes.

I claim:

1. In a machine for manufacturing box-drawers the combination of a continuously rotating mandrel, a second mandrel mounted co-axially with the former, and means for imparting to the said latter mandrel an oscillating movement, at intervals, so that the said latter mandrel rotates, at intervals, synchronously with the former, substantially as and for the purpose set forth.

2. In a machine for manufacturing box-drawers the combination of a continuously rotating mandrel, a second mandrel mounted co-axially with the former, means for causing the said latter mandrel to rotate synchronously with the former so as to allow a box-blank to be moved from one mandrel onto the other, and to thereupon stop for enabling a bottom to be attached to the box-blank, substantially as and for the purpose set forth.

3. In a machine for manufacturing box-drawers the combination of a continuously rotating mandrel, a second mandrel mounted co-axially with the former, a gear wheel connected to the said latter mandrel, a cog segment engaging the said gear wheel, and means for imparting an oscillating movement to the said cog segment, substantially as and for the purpose set forth.

4. In a machine for manufacturing box-drawers the combination of a continuously rotating mandrel, a second mandrel mounted co-axially with the former, a gear wheel connected to the said latter mandrel, a cog segment engaging the said gear wheel, a cam actuating the said cog segment, and a spring adapted to press the said cog segment against the cam substantially as and for the purpose set forth.

5. In a machine for manufacturing box-drawers the combination of a continuously rotating mandrel, a second mandrel mounted co-axially with the former, a gear wheel connected to the said latter mandrel, a cog segment engaging the said gear wheel, a roller carried by the said cog segment, a rotary cam bearing on the said roller, and a spring adapted to press the said roller against the cam, substantially as and for the purpose set forth.

In testimony whereof I have signed my name to this specification in the presence of two subscribing witnesses.

JOHAN GUSTAF OLSSON.

Witnesses:
A. LAGERHOLM,
EDVIN SVENSSON.